United States Patent [19]

Allen

[11] Patent Number: 4,643,375
[45] Date of Patent: Feb. 17, 1987

[54] SPACE LIVING QUARTERS HAVING ARTIFICIAL GRAVITY ENVIRONMENT

[76] Inventor: Sebree J. Allen, Rt. 2, Kevil, Ky. 42053

[21] Appl. No.: 748,925

[22] Filed: Jun. 26, 1985

[51] Int. Cl.[4] .............................................. B64G 1/46
[52] U.S. Cl. .................................... 244/159; 244/162; 244/163
[58] Field of Search ................... 244/158 R, 159, 162, 244/163

[56] References Cited

U.S. PATENT DOCUMENTS

| Re. 26,475 | 10/1968 | Cohen | 244/162 |
|---|---|---|---|
| 3,144,219 | 8/1964 | Schnitzer | 244/159 |
| 3,169,725 | 2/1965 | Berglund | 244/159 |
| 3,210,026 | 10/1965 | Frisch | 244/159 |
| 3,300,162 | 1/1967 | Maynard et al. | 244/159 |
| 3,333,788 | 8/1967 | Dryden | 244/158 R |
| 3,348,352 | 10/1967 | Cummings | 244/159 |
| 3,749,332 | 7/1973 | Gray | 244/163 |
| 4,175,723 | 11/1979 | Shea, Jr. | 244/162 |

OTHER PUBLICATIONS

"Rocketship" by Robert Malone, © 1977, New York, NY, pp. 118–119.

Primary Examiner—Trygve M. Blix
Assistant Examiner—Rodney Corl
Attorney, Agent, or Firm—Harrington A. Lackey

[57] ABSTRACT

Living quarters for a space vehicle including a rotary cylindrical module enclosing a living compartment for human occupancy, and means for rotating the module about its longitudinal central axis to create a force of approximately 1 G within the module adjacent the outer wall, and an entrance opening formed within one end wall of the cylindrical module to permit the passage of a human coccupant from the zero-gravity space within a space vehicle into the artificial-gravity environment of the living compartment. An inside ladder is mounted within the living compartment, extending radially from the entrance opening to the outside wall of the cylindrical housing to permit the occupant to move from a zero-gravity environment gradually toward the 1 G environment. A platform, such as an outside ladder, is preferably rotatably mounted outside the module adjacent the entrance opening to permit an occupant standing upon the platform to easily pass through the entrance opening into the living compartment. The living compartment may be furnished and equipped to provide sleeping, recreational, or restroom facilities within a 1 G environment.

15 Claims, 6 Drawing Figures

SPACE LIVING QUARTERS HAVING ARTIFICIAL GRAVITY ENVIRONMENT

BACKGROUND OF THE INVENTION

This invention relates to a space vehicle, and more particularly to living quarters having a 1 G environment within the space vehicle.

Space travel produces a weightless condition which alters the normal body metabolism as well as bodily functions of human occupants of a space vehicle. In order to overcome the weightless conditions of space travel, the body of the space vehicle itself may be rotated about an axis in order to generate an artificial gravity effect, particularly in the living quarters of the occupants of the space vehicle, as illustrated in the following U.S. patents:

| | | |
|---|---|---|
| 3,169,725 | Berglund | Feb. 16, 1965 |
| 3,210,026 | Frisch | Oct. 5, 1965 |
| 3,300,162 | Maynard et al | Jan. 24, 1967 |
| 3,333,788 | Dryden | Aug. 1, 1967 |
| 3,749,332 | Gray | Jul. 31, 1973 |
| 4,057,207 | Hogan | Nov. 8, 1977 |

The above Berglund and Maynard et al patents also disclose separate rotatable space lab capsules, primarily designed to create zero-gravity conditions relative to the rest of the vehicle.

U.S. Pat. No. 3,405,454 issued to Zeff on Oct. 15, 1968, discloses a waste management system for collecting and storage of waste products under weightless conditions, particularly in space vehicles.

U.S. Pat. Nos. 3,536,324 of Ahrens issued Oct. 27, 1970, and 4,389,047 issued to Hall on June 21, 1983, disclose rotary treadmills.

FIG. 4 of the Frisch U.S. Pat. No. 3,210,026 discloses a ladder 82 permitting an occupant of the space vehicle to move from a zero or low-gravity chamber 24 to a higher-gravity living quarters 32.

In column 1, lines 59-63 of the Dryden patent, and column 1, lines 63-67, and column 2, lines 1-3 of the Gray patent, is described, as prior art, a proposal for a centrifuge type of device within a space vehicle into which the occupants of the space ship can enter at certain intervals for subjection to artificial gravity forces. However, neither Dryden nor Gray disclose any specific structure for carrying out such proposals.

SUMMARY OF THE INVENTION

It is therefore an object of this invention to provide a centrifuge-type module incorporating a living compartment having an artificial gravity environment, which is easily accessible to the occupants of a space vehicle having a weightless environment, for interludes of rest, recreation and restoration of bodily metabolism and functions.

More particularly, the module is an enclosed cylindrical living compartment having an outer cylindrical wall and opposed end walls mounted within the weightless chamber of a space vehicle for rotation about the lingitudinal central axis of the module. The module is particularly characterized by an entrance opening formed in one of the end walls of the module at substantially the center of the module. An inside ladder extends radially from the entrance opening toward the outer wall of the module to permit the occupant entering through the entrance opening to gradually move from zero-gravity to 1 G adjacent the outer wall within the interior of the module, where the occupant will occupy a space within a 1 G environment.

An outside platform in the form of a rotary ladder is mounted adjacent to and outside the entrance opening so that the occupant of the space vehicle may approach the entrance of the module from any direction and be provided with a platform to facilitate entry through the entrance opening into the rotating module.

The centrifugal living compartment within the module may be furnished and equipped to provide a sleeping area, a recreational area, rest room area, or combinations of such areas. Lightweight or portable beds or bedding may be located in the living compartment to lie longitudinally along the inner surface of the outer wall of the rotating module, parallel to the rotational axis of the module, to permit sleeping in an artificial gravity environment. When the occupants are not sleeping, the beds may be moved and stowed against the end walls of the cylindrical module so that the outer cylindrical wall of the module may be used for jogging, exercise, or other recreational activities.

A centrifugal-type module made in accordance with this invention may also be provided with a diametrical partition wall to provide 2 restroom facilities, with access to either restroom facility through the same large entrance opening in the end wall of the module.

The centrifugal-type module may be driven by any desired means, such as by motor-driven drive rollers engaging the cylindrical periphery of the module, which is supported and guided for rotary movement by circumferentially spaced guide rollers engaging a circumferential track or raceway fixed on the periphery of the module.

DESCRIPTION OF THE PREFERRED EMBODIMENTS

Figure 1:
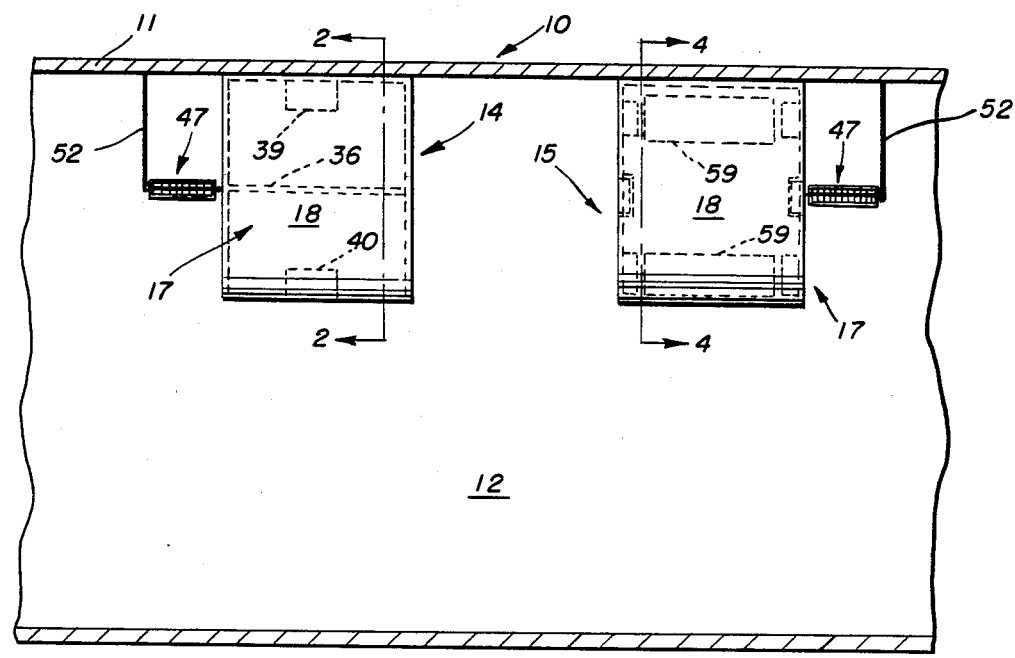
FIG. 1 is a fragmentary sectional elevation of the hull of a space vehicle in which is mounted a pair of centrifugal-type modules, one providing restroom facilities and the other providing sleeping and recreational facilities.

Referring now to the drawings in more detail, FIG. 1 discloses a space vehicle 10 including a cylindrical hull 11 enclosing a vehicle space or chamber 12 subject to a weightless or zero-gravity environment or condition.

As disclosed in FIG. 1, a living quarters apparatus 14 is supported within the vehicle chamber 12, which is provided with restroom or toilet facilities. Also supported within the vehicle chamber 12 is a second apparatus 15, which is particularly equipped for sleeping and recreational accommodations. It will be understood that either of the apparatus 14 or 15 may be utilized within the vehicle chamber 12, or several such apparatus may be supported within the vehicle chamber 12, which may include duplicate or alternate facilities for various types of living quarters.

Figure 3:
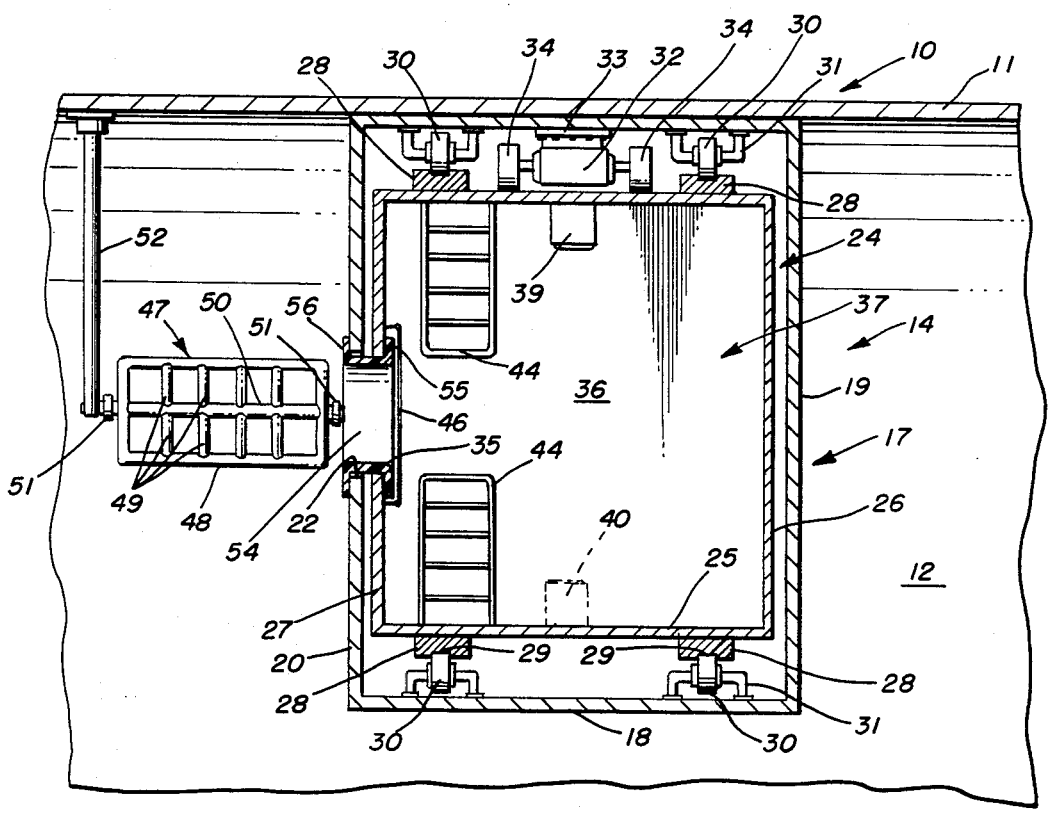
FIG. 3 is a section taken along the line 3—3 of FIG. 2 with the centrifugal-type module in its original position disclosed in FIG. 1.
Figure 2:
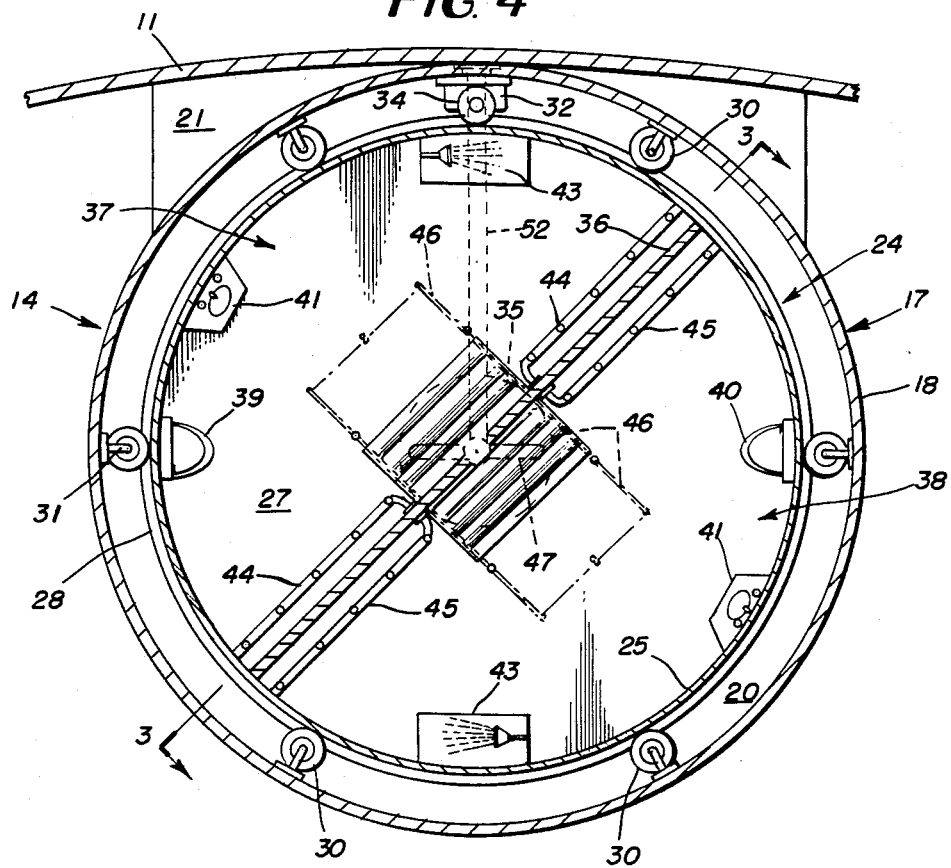
FIG. 2 is an enlarged section taken along the line 2—2 of FIG. 1 in which the centrifugal-type module has been rotated about 45° from its position disclosed in FIG. 1.

As best disclosed in FIGS. 1, 2 and 3, the apparatus 14 includes a support or mounting device, such as the cylindrical housing 17 including a cylindrical wall 18 and a pair of opposite end walls 19 and 20. The cylindrical mounting housing 17 may be fixedly secured tangentially to the interior of the hull 11 by a mounting bracket 21 (FIG. 2). The mounting bracket 21 may be secured to the hull 11 and the cylindrical wall 18 by welding or other means, if desired.

An entry opening 22, preferably circular, is formed in one of the end walls, such as the end wall 20, substantially in its center portion coaxial with the longitudinal cylindrical axis of the housing 17. The entry opening 22 is large enough for a human occupant to pass therethrough. An entry opening, such as 22, could also be formed in the center portion of the opposite end wall 19, if desired.

Rotatably mounted and contained within the cylindrical housing 17, is a cylindrical module or capsule 24. The cylindrical capsule 24 has a cylindrical outer wall 25 and a pair of opposed end walls 26 and 27.

In order to support the module 24 for rotation coaxially within the cylindrical housing 17, a pair of circular tracks or guideways 28 having circumferential grooves 29 therein, are fixed around the outer surface of the outer cylindrical wall 25 of the module 24. Adapted to ride within the grooves 29 of the tracks 28 are a plurality of circumferentially spaced guide rollers 30 supported in roller brackets 31 which are fixed at circumferentially spaced intervals upon the interior surface of the cylindrical housing wall 18. Six of the rollers 30 are disclosed in FIG. 2 for engaging each of the tracks 28. Of course, more or fewer rollers 30 may be utilized.

In order to drive the cylindrical module 24 for rotation about its own longitudinal central axis, motor 32 is mounted on motor bracket 33 fixed to the inner surface of the housing wall 18, as disclosed in FIGS. 2 and 3. The motor 32 drives a pair of drive rollers 34 which are coaxial of each other and parallel to the longitudinal central axis of the cylindrical module 24, so that the drive rollers 34 will frictionaly engage the outer cylindrical surface of the wall 25 to simultaneously drive the cylindrical module 24 in the opposite rotary direction. The motor 32 may be electrical, pneumatic or hydraulic, and may be provided with variable speed controls or transmissions, for driving, and varying the speed of rotation of, the cylindrical housing 24.

An entrance opening 35 is located in substantially the center of the end wall 27 and in coaxial alignment with the entry opening 22. The entrance opening 35 is also large enough to permit the passage of a human occupant through the entrance opening 35.

In the apparatus 14, a partition wall 36 is disposed diametrically and longitudinally within the module 24 to divide the space within the module 24 into two rooms, such as the restrooms 37 and 38 of substantially equal size. Both restrooms 37 and 38 are accessible through the entrance opening 35 which is bisected by the partition wall 36. The size of the entrance opening 35 is sufficiently great to permit the passage of a human occupant through the entrance opening 35 into either the restroom 37 or the restroom 38. Each of the restrooms 37 and 38 is provided with respective toilet facilities 39 and 40 which may be supported against the opposite sides of the partition wall 36 and, diametrically opposite portions of the outer wall 25. Other facilities, such as the lavatories 41, and shower stalls 43, may also be mounted at desired locations along the outer walls of each of the restrooms 37 and 38. Preferably, like facilities are located diametrically opposite each other to counterbalance the corresponding weights of the facilities about the rotational axis of the module 24.

Mounted on opposite surfaces of the partition wall 36 are elongated inside ladders 44 and 45. The inside ladders 44 are on one side of a partition wall 36, within the restroom 37, while the ladders 45 are located on the opposite side of the partition wall 36 in the restroom 38. Although two ladders are disclosed each restroom 37 and 38, nevertheless, only one ladder 44 and 45 may be utilized for each restroom 37 and 38, if desired. Each ladder 44 and 45 extends longitudinally from a position adjacent the entrance opening 35 radially toward the outer wall 25. In this manner, an occupant entering through the entrance opening 35 may control his radial movement into the interior of the module 24 gradually through the gravitational changes in force from zero gravity to 1 G adjacent the interior of the cylindrical outer wall 25.

Enclosures such as the hinged curtain closures 46 may be utilized to cover the entrances to the respective restrooms 37 and 38, for privacy.

Mounted outside the entry opening 22 of the support housing 17, is a platform member 47. The particular platform member 47 disclosed in the drawings may be in the form of an elongated ladder 48 having transverse steps or rungs 49. The ladder 48 may include an elongated central tubular sleeve 50 receiving a shaft, not shown, upon which the ladder 48 is journaled by the journal bearings 51. The elongated shaft hidden within the tubular sleeve 50 is fixed to a support arm or bracket 52, which is fixed to the hull 11 of the space vehicle 10, as best disclosed in FIG. 3. The platform member 47 may be rotated to various positions by an occupant or astronaut approaching the entry opening 22 from various positions within the vehicle chamber 12.

The bearings 51 may be provided with frictional resistance or a braking device to prevent complete freewheeling of the ladder 48 about its longitudinal shaft. Thus, the ladder 48 may be manually rotated about its longitudinal axis and retain its adjusted position.

The platform member 47 provides a station where the occupant may stand or crouch or come to rest, preparatory to entering the entry opening 22 and the entrance opening 35 into the interior of the module 24.

A collar or entry liner 54, disclosed in FIG. 3, terminating in an inner annular flange 55 and an outer annular flange 56 is fitted concentrically through both the entry opening 22 and the entrance opening 35 to form an entry tunnel through which the occupant or astronaut may pass without exposure to the relatively counter-rotating rims of the opening or the space between the rims. The inner flange 55 is fixedly secured to the portion of the end wall 27 surrounding the entrance opening 35, while the liner 54 and outer flange 56 freely rotate relative to the fixed entry opening 22.

Since the apparatus 15 differs from the apparatus 14 only in the interior construction and equipment of the rotary module, like parts in the apparatuses 14 and 15 will be identified by identical reference numerals.

Figure 4:
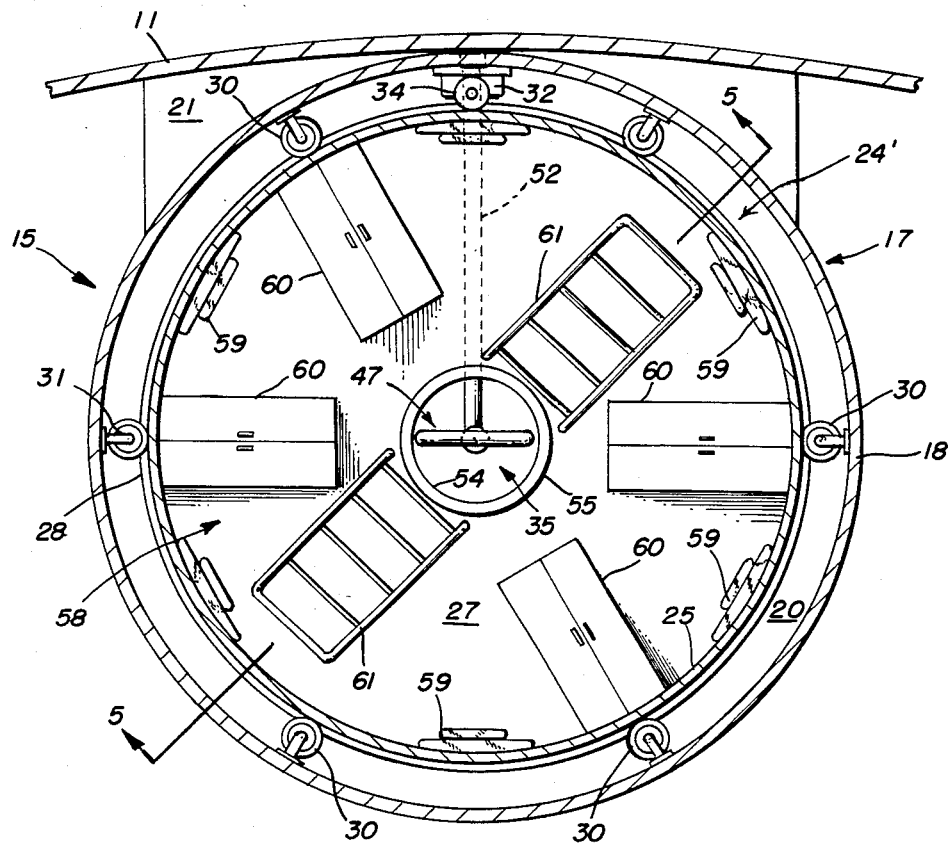
FIG. 4 is an enlarged fragmentary section taken along the line 4—4 of FIG. 1.
Figure 5:
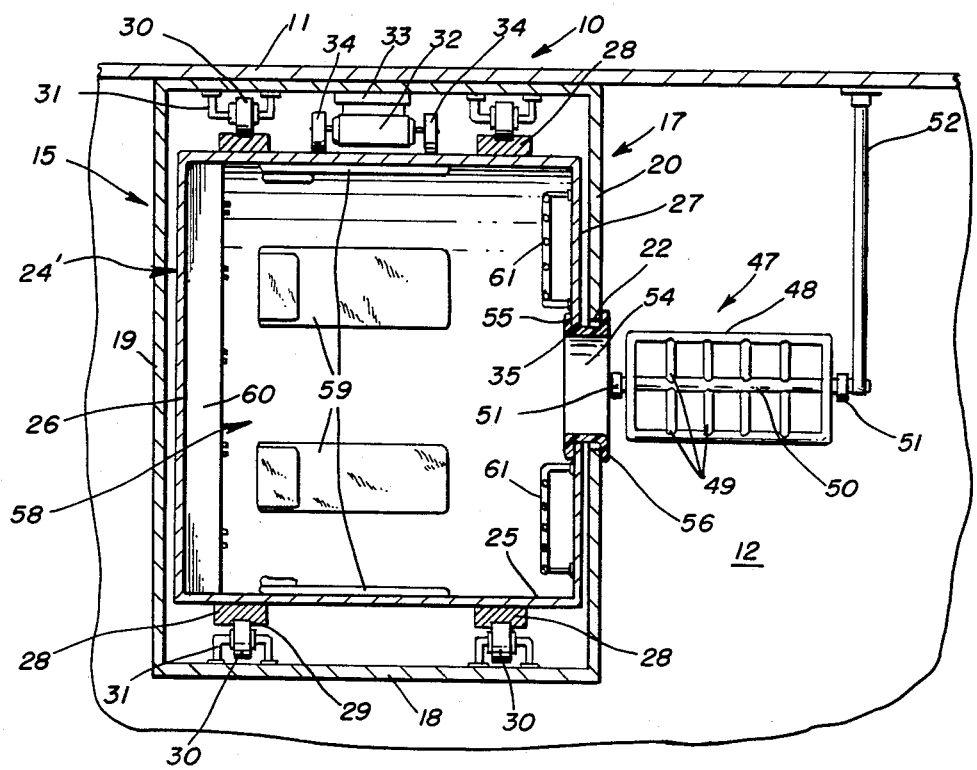
FIG. 5 is a fragmentary section taken along the line 5—5 of FIG. 4 with the centrifugal-type module counter-rotated 45°.

The rotary cylindrical module 24' disclosed in FIGS. 4 and 5 is structurally identical to the cylindrical module 24, having the same cylindrical outer wall 25 and the same end walls 26 and 27 and entrance opening 35. However, the cylindrical module 24' does not have a partition wall 36, so that the entire space or living compartment 58 within the module 24' may be utilized, such as for sleeping or recreation.

As disclosed in FIGS. 4 and 5, a plurality of sleeping bags or pallets 59 are disposed in operative sleeping positions against the interior surface of the cylindrical wall 25 and extend lengthwise parallel to the central rotational axis of the module 24', as best disclosed in FIGS. 4 and 5.

When the sleeping bags 59 are not in use, they may be stacked, folded or rolled into compact packages and stowed against one of the end walls 26 or 27, or in one of the storage cabinets 60, to provide the maximum amount of available space within the compartment 58, for other activities.

In order to facilitate controlled access to the interior of the compartment 58, one or more inside ladders 61 may be mounted on the interior of the end wall 27 to extend lengthwise from a position adjacent the entrance opening 35 radially outward to the outer cylindrical wall 25, as disclosed in FIGS. 4 and 5.

It will be understood that either one or two ladders 61 may be utilized within the living compartment 52. Again, each of the inside ladders 61, permits an astronaut or occupant entering through the entrance opening 35, to gradually move from the zero gravity environment adjacent the entrance opening 35, radially outward to the 1 G environment adjacent the outer cylindrical wall 25.

The same platform member 45, as used in the apparatus 14, may also be used in the apparatus 15.

Figure 6:
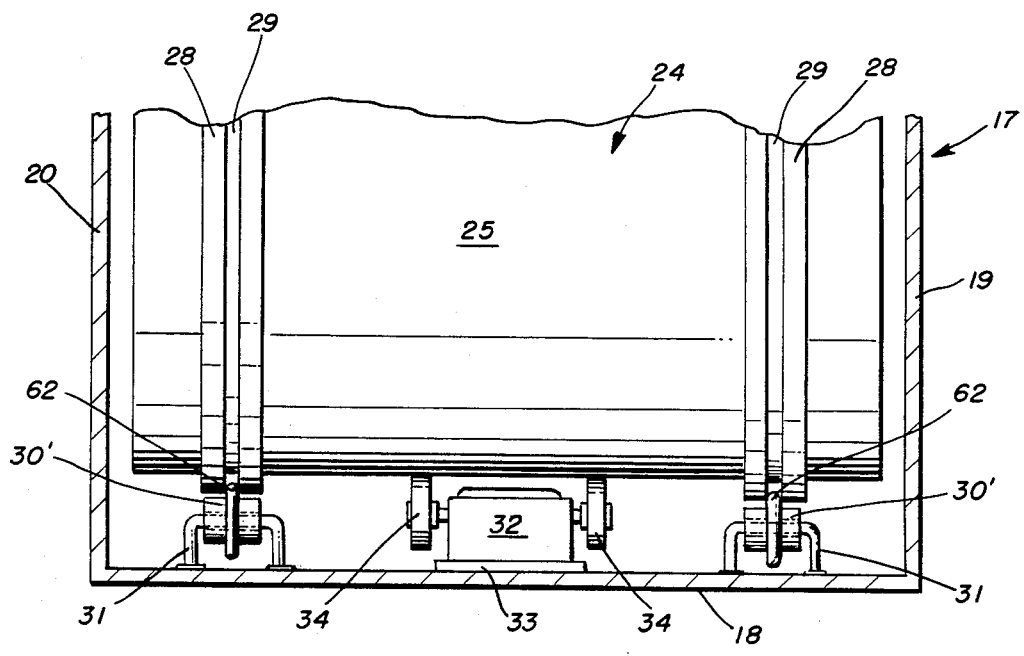
FIG. 6 is an enlarged fragmentary sectional elevation of the drive support housing in an upside-down position from that disclosed in FIGS. 1-5, illustrating the drive rollers engaging the periphery of the centrifugal-type module shown fragmentarily in side elevation.

As disclosed in FIG. 6, rollers 30' having annular ribs 62 may be utilized instead of the rollers 30 so that the ribs 62 will fit within the annular groove 29 of the circumferential track 28.

It will therefore be seen that a centrifugal living quarters apparatus 14 or 15 has been designed for support within the weightless interior of a space vehicle, which provides a readily accessible living compartment subjected to artificial gravity where an astronaut or occupant can enter for rest, resuscitation and restoral of bodily and mental functions.

Although centrifuges are known, nevertheless, it is believed that a unique centrifugal living compartment has been designed which facilitates access into the compartment, and permits the occupant, after entry, to gradually move in a controlled manner from a zero or weightless condition through gradually increasing centrifugal forces to an artificial gravitational environment similar to that of the surface of the earth. This optimum design for a centrifugal living compartment is obtained by removal of any central shafts for supporting the rotation of the module and by supporting the centrifugal module on its outer perimeter for rotation. Moreover, the entrance to the centrifugal cylindrical module is placed in the center of one of the end walls, without any obstruction to the passage through the opening, so that the astronaut or occupant may enter the living compartment at zero gravity, and experience a controlled transition into the 1 G environment at the periphery of the cylindrical wall of the module.

It will be observed in FIGS. 4 and 5 that the sleeping bags or pallets 59 are disposed along the interior surface of the outer cylindrical wall where the 1 G forces are experienced.

When the occupant leaves either of the restrooms 37, 38 or the sleeping compartment 58, he reverses the procedure for entering the respective compartments. The occupant moves along the respective inside ladders 44, 45 or 61, gradually at a controlled rate as he experiences decreasing centrifugal forces until he reaches the entrance opening 35 where he returns to a weightless condition. The occupant then moves through the openings 35 and 22 and grasps the platform member 47 and rotates it to its desired position about its longitudinal axis. The occupant then climbs outward upon the platform member 47 where he is free to launch himself in any desired direction within the vehicle chamber 12.

It is also within the scope of this invention to provide storage shelves or cooking facilities within the compartment 58, preferably on the end walls 26 or 27, and also to utilize the interior surface of the circumferential wall 25 in the compartment 58 as a jogging track for exercise and recreation after the pallets 59 have been removed and stowed.

What is claimed is:

1. In a space vehicle including a vehicle chamber subject to zero-gravity during space flight, living quarters subject to artificial gravity comprising:
   (a) a cylindrical module enclosing a living compartment for human occupants, said module having a cylindrical outer wall, opposite end walls, and a longitudinal central axis;
   (b) support means mounting said module within the vehicle chamber for rotary movement about said longitudinal central axis;
   (c) drive means for rotating said module about said central axis to create a centrifugal force of approximately 1 G within said living compartment, and
   (d) an entrance opening through the central portion of one of said end walls, large enough to permit the passage of a human occupant between the vehicle chamber and said living compartment.

2. The invention according to claim 1 further comprising inside ladder means extending radially within said module from said entrance opening towards said outer wall.

3. The invention according to claim 1 further comprising outside platform means, means mounting said platform means within the vehicle chamber and adjacent to said entrance opening to permit a human occupant to occupy said platform means before passing through said entrance opening.

4. The invention according to claim 3, in which said platform means comprises an outside elongated ladder having a longitudinal central axis, said mounting means for said platform means comprising journal means rotatably supporting said outside ladder for rotary movement about its longitudinal axis, said outside ladder comprising longitudinally spaced step rungs disposed transversely of said outside ladder.

5. The invention according to claim 2, in which said inside ladder means comprises an elongated ladder having longitudinally spaced transverse step rungs, said inside ladder being mounted on said end wall containing said entrance opening, the longitudinal axis of said inside ladder being disposed radially of said end wall.

6. The invention according to claim 5, further comprising outside platform means, means supporting said outside platform means in the vehicle chamber outside of and adjacent said entrance opening to permit a human occupant occupying said platform means to pass through said entrance opening.

7. The invention according to claim 5 in which the longitudinal axial dimension of said module is greater than the height of any human occupant of said module to permit said human occupant to lie parallel to said longitudinal central axis along said outer wall within said module, in a sleeping position.

8. The invention according to claim 2 further comprising a partition wall extending diametrically and substantially the full length of said module to divide said living compartment into two rooms, said entrance opening permitting passage of a human occupant to either of said rooms.

9. The invention according to claim 8 in which said ladder means comprises first and second elongated inside ladders, said inside ladders being mounted on opposite sides of said partition wall, and both of said inside ladders extending radially from said entrance opening toward said outside wall.

10. The invention according to claim 8, further comprising separate toilet facilities in each of said rooms on opposite sides of said partition wall and adjacent to said outer wall.

11. The invention according to claim 1 in which said support means mounting said module within the vehicular chamber for rotary movement about said longitudinal central axis comprises roller guide means rollably supporting said module upon said outer cylindrical wall.

12. The invention according to claim 11, in which said roller guide means comprises means supporting a plurality of circumferentially spaced rollers around the cylindrical outer wall of said module, and circular track means fixed circumferentially about said outer wall and engaging said rollers for free rotary movement of said module upon said rollers, said drive means comprising a motor fixed to the vehicle chamber and drive rollers driven by said motor and engaging the exterior periphery of said outer wall for rotatably driving said cylindrical module.

13. The invention according to claim 12 in which said support means mounting said module comprises a cylindrical housing coaxial with, but larger than, said cylindrical module, said cylindrical housing having an end wall including an entry opening coaxial with said entrance opening, and said cylindrical housing having a cylindrical wall, said rollers and said motor being fixed to the cylindrical wall of said housing.

14. The invention according to claim 13, further comprising a tubular entry liner mounted coaxially within said entrance opening and said entry opening and extending therethrough.

15. The invention according to claim 14 in which said entry liner is fixed to said end wall of said module surrounding said entrance opening, and is adapted to freely rotate within said entry opening.

* * * * *